US012592854B2

(12) United States Patent
Bouazizi et al.

(10) Patent No.: US 12,592,854 B2
(45) Date of Patent: Mar. 31, 2026

(54) BUNDLING SERVICES PROVIDED BY EDGE APPLICATION SERVERS

(71) Applicant: QUALCOMM Incorporated, San Diego, CA (US)

(72) Inventors: Imed Bouazizi, Frisco, TX (US); Alan Soloway, Frederick, CO (US); Nishant Gupta, Bangalore (IN)

(73) Assignee: QUALCOMM INCORPORATED, San Diego, CA (US)

( * ) Notice: Subject to any disclaimer, the term of this patent is extended or adjusted under 35 U.S.C. 154(b) by 109 days.

(21) Appl. No.: 18/692,998

(22) PCT Filed: Nov. 2, 2022

(86) PCT No.: PCT/US2022/079126
§ 371 (c)(1),
(2) Date: Mar. 18, 2024

(87) PCT Pub. No.: WO2023/081690
PCT Pub. Date: May 11, 2023

(65) Prior Publication Data
US 2024/0396795 A1      Nov. 28, 2024

(30) Foreign Application Priority Data

Nov. 3, 2021      (IN) .............................. 202141050520

(51) Int. Cl.
  *H04L 41/0806*      (2022.01)
  *H04L 67/10*      (2022.01)
  *H04L 67/51*      (2022.01)
(52) U.S. Cl.
  CPC .......... *H04L 41/0806* (2013.01); *H04L 67/10* (2013.01); *H04L 67/51* (2022.05)

(58) Field of Classification Search
  CPC ..... H04L 41/0806; H04L 67/10; H04L 67/51; H04L 67/567; H04L 67/60
  See application file for complete search history.

(56) References Cited

U.S. PATENT DOCUMENTS

| | | | |
|---|---|---|---|
| 2021/0307089 A1 | 9/2021 | Kim et al. | |
| 2022/0086218 A1 | 3/2022 | Sabella et al. | |
| (Continued) | | | |

FOREIGN PATENT DOCUMENTS

| | | | |
|---|---|---|---|
| WO | 2022068463 A1 | 4/2022 | |
| WO | 2022194359 A1 | 9/2022 | |
| WO | 2022240070 A1 | 11/2022 | |

OTHER PUBLICATIONS

3GPP TS 23.558: "3rd Generation Partnership Project, Technical Specification Group Services and System Aspects, Architecture for Enabling Edge Applications, (Release 17)", 3GPP Standard, Technical Specification, V2.0.0, vol. 17 Mar. 2021, Online, pp. 1-141, XP055976404, the whole document.

(Continued)

*Primary Examiner* — Tonia L Dollinger
*Assistant Examiner* — Mehulkumar J Shah
(74) *Attorney, Agent, or Firm* — Shumaker & Sieffert, P.A.

(57) ABSTRACT

An example client device for accessing data from a plurality of edge application servers (EASs) includes one or more processors configured to receive data representing a bundle identifier (ID) for a bundle of EASs from an application service provider (ASP); send a request including the bundle ID to an edge configuration server (ECS); in response to the request, receive information representing the EASs in the bundle from the ECS; in response to the information representing each of the EASs, send one or more EAS discovery requests to one or more edge enabler servers (EESs); in response to the one or more EAS discovery requests, receive (Continued)

information for communicating with one or more of the EASs from the one or more EESs; and initiate the application data traffic session between the AC of the UE device and the one or more of the EASs in the bundle of EASs.

20 Claims, 6 Drawing Sheets

(56) References Cited

U.S. PATENT DOCUMENTS

| | | | |
|---|---|---|---|
| 2022/0330128 A1 | 10/2022 | Kim et al. | |
| 2023/0135220 A1* | 5/2023 | Sodagar | H04L 65/612 |
| | | | 345/633 |
| 2023/0180117 A1* | 6/2023 | Lee | H04L 67/289 |
| | | | 370/329 |
| 2023/0370527 A1* | 11/2023 | Xu | H04L 67/51 |
| 2024/0187303 A1* | 6/2024 | Yao | H04L 67/51 |

OTHER PUBLICATIONS

International Search Report and Written Opinion—PCT/US2022/079126—ISA/EPO—Mar. 17, 2023 9 Pages.

\* cited by examiner

RECEIVE EAS BUNDLE
DATA FROM ASP ⌐200

RECEIVE DATA IDENTIFYING
INSTANCES OF EASs
FROM EESs of EDNs ⌐202

RECEIVE SERVICE
PROVISIONING REQUEST
FROM UE ⌐204

SEND DATA
REPRESENTING EDNs
INCLUDING THE EASs TO UE ⌐206

RECEIVE BUNDLE ID FOR BUNDLE OF EASs FROM ASP ~230

SEND SERVICE PROVISIONING REQUEST TO ECS ~232

RECEIVE EDN INFORMATION ~234

SEND EAS DISCOVERY REQUESTS TO EESs ~236

RECEIVE EAS INFORMATION FROM EESs ~238

INITIATE APPLICATION DATA TRAFFIC SESSION BETWEEN AC AND EASs OF BUNDLE ~240

BUNDLING SERVICES PROVIDED BY EDGE APPLICATION SERVERS

This application is a national stage application under 35 U.S.C. § 371 of PCT Application No. PCT/US2022/079126, filed Nov. 2, 2022, which claims priority to and the benefit of Indian Provisional Application No. 202141050520, filed Nov. 3, 2021, the entire contents of each of which are hereby incorporated by reference.

TECHNICAL FIELD

This disclosure relates to transmission of media data over a computer network.

BACKGROUND

Fifth Generation (5G) computer networks may include edge devices in the network (e.g., the cloud) that provide services to user equipment (UE) devices. Edge Application Servers (EASs) represent examples of such devices. EASs may form part of Edge Data Networks (EDNs). In order to access services provided by EASs, UE devices may communicate with Edge Configuration Servers (ECSs) and Edge Enabler Servers (EESs) of the EDNs. For example, an Edge Enabler Client (EEC) of the UE device may discover an ECS, then perform service provisioning to discover the EES. The ECS may provide information to the EEC to connect to the EES (such as a network address of the EES). The EEC may then communicate with the EES to enable exchange of application data with the EAS, such that an application client of the UE device can communicate with the EAS.

SUMMARY

In general, this disclosure describes techniques for bundling services offered by multiple different Edge Application Servers (EASs). In some cases, multiple different EASs may be involved in a service for a user equipment (UE) device. As one example, remote gaming may include a first EAS configured as a game engine to receive user input and render graphical output in response to the user input, and a second EAS configured to receive the graphical output, encode the graphical output, and send the encoded graphical output to the UE device. The UE device may decode and display the graphical output, receive user input, and provide the user input to the first EAS. As such, the first and second EASs would need to be configured to coordinate their services to reduce latency when sending data to the UE device.

In one example, a method of accessing data from a plurality of edge application servers (EASs) includes receiving, by an edge enabler client (EEC) of a user equipment (UE) device, data representing a bundle identifier (ID) for a bundle of EASs from an application service provider (ASP); sending, by the EEC, a service provisioning request including the bundle ID to an edge configuration server (ECS); in response to the service provisioning request, receiving, by the EEC, information representing each of the EASs in the bundle of EASs from the ECS; in response to the information representing each of the EASs, sending, by the EEC, one or more EAS discovery requests to one or more edge enabler servers (EESs); in response to the one or more EAS discovery requests, receiving, by the EEC, information for communicating with one or more of the EASs in the bundle of EASs from the one or more EESs; and initiating, by the EEC, an application data traffic session between an application client (AC) of the UE device and the one or more of the EASs in the bundle of EASs.

In another example, a user equipment (UE) device for accessing data from a plurality of edge application servers (EASs) includes: a memory configured to store application data exchanged via an application data traffic session between an application client (AC) of the UE device; and an edge enabler client (EEC) comprising one or more processors implemented in circuitry, the EEC being configured to: receive data representing a bundle identifier (ID) for a bundle of EASs from an application service provider (ASP); send a service provisioning request including the bundle ID to an edge configuration server (ECS); in response to the service provisioning request, receive information representing each of the EASs in the bundle of EASs from the ECS; in response to the information representing each of the EASs, send one or more EAS discovery requests to one or more edge enabler servers (EESs); in response to the one or more EAS discovery requests, receive information for communicating with one or more of the EASs in the bundle of EASs from the one or more EESs; and initiate the application data traffic session between the AC of the UE device and the one or more of the EASs in the bundle of EASs.

In another example, a method of configuring application data traffic exchange between a user equipment (UE) device and a plurality of edge application servers (EASs) includes: receiving, by an edge configuration server (ECS), data from an application service provider (ASP) representing a bundle of EASs, the data including a bundle identifier (ID) representing the bundle of EASs and data representing each of the EASs included in the bundle of EASs; receiving, by the ECS, data identifying instances of each of the EASs in the bundle of EASs from one or more edge enabler servers (EESs) of one or more edge data networks (EDNs) for the EASs; receiving, by the ECS, a service provisioning request including the bundle ID from a user equipment (UE) device; and sending, by the ECS, in response to the service provisioning request, data representing the one or more EDNs including the EASs to the UE device.

In another example, an edge configuration server (ECS) device for configuring application data traffic exchange between a user equipment (UE) device and a plurality of edge application servers (EASs) includes: a memory; and one or more processors implemented in circuitry and configured to: receive data from an application service provider (ASP) representing a bundle of EASs, the data including a bundle identifier (ID) representing the bundle of EASs and data representing each of the EASs included in the bundle of EASs; receive data identifying instances of each of the EASs in the bundle of EASs from one or more edge enabler servers (EESs) of one or more edge data networks (EDNs) for the EASs; receive a service provisioning request including the bundle ID from a user equipment (UE) device; and send, in response to the service provisioning request, data representing the one or more EDNs including the EASs to the UE device.

The details of one or more examples are set forth in the accompanying drawings and the description below. Other features, objects, and advantages will be apparent from the description, drawings, and claims.

DETAILED DESCRIPTION

In some instances, a media communication session may relate to mixed media data, e.g., including audio, video, and/or extended reality (XR) data such as augmented reality (AR) data, mixed reality (MR) data, and/or virtual reality (VR) data. Various types of media data may originate from distinct edge application servers (EASs). This disclosure describes techniques related to bundling EASs using a bundle identifier (bundle ID), e.g., for a common media communication session including transmissions from the bundled EASs. This may allow for dependencies between EASs, such as common presentation times between various types of media data (e.g., that certain audio data, video data, and XR data should be presented at the same presentation time). This disclosure also describes techniques for provisioning bundling of EASs, registration of EAS bundles, edge enabler server (EES) registration, edge enabler client (EEC) service provisioning, EAS discovery, description, and relocation. In this manner, EASs may operate in a cooperative manner to serve an application client (AC) of a user equipment (UE) device, which may thereby improve user experience, reduce latency, reduce buffering demands, and reduce retransmission of media data for the session.

Figure 1:
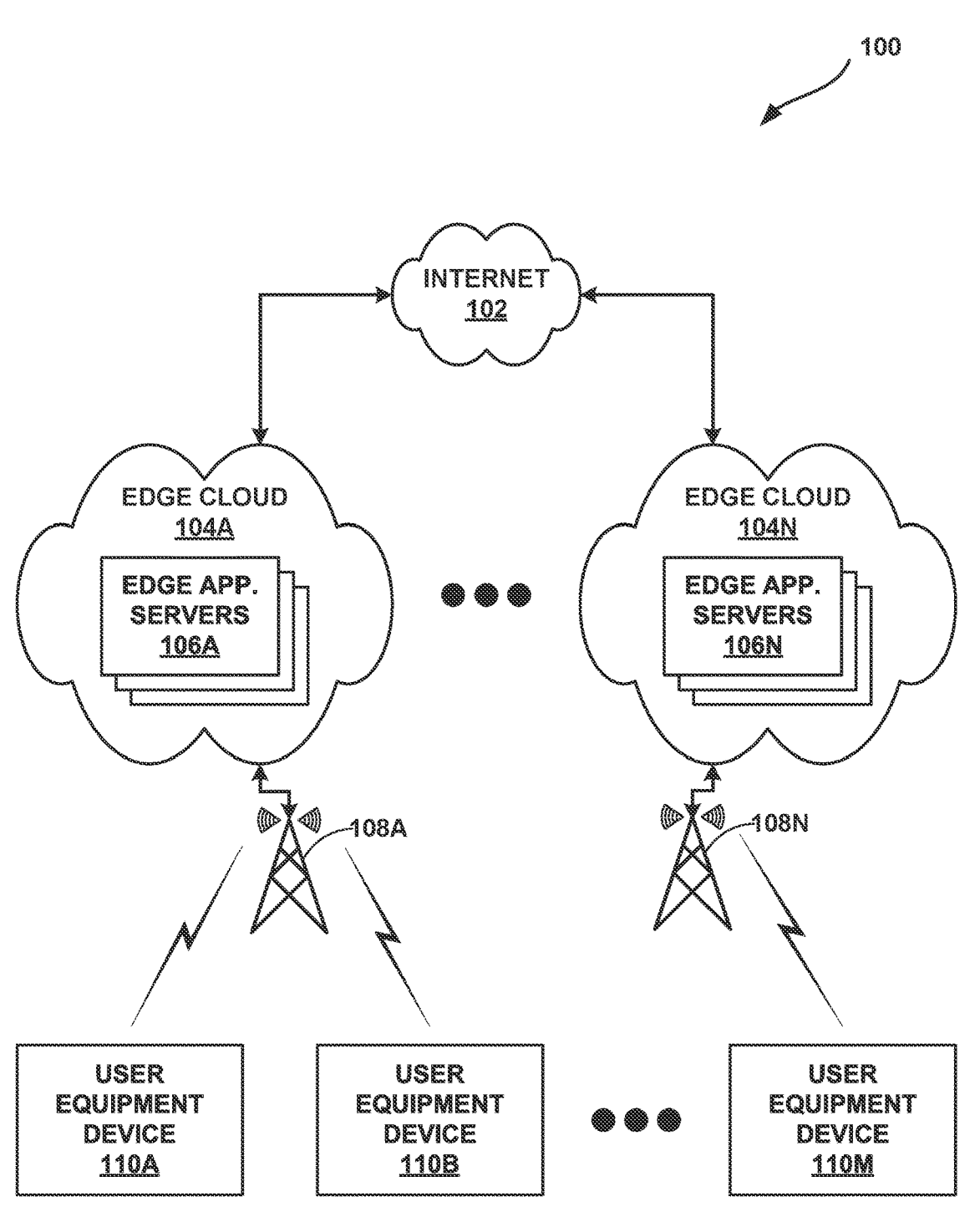
FIG. 1 is a block diagram illustrating an example system for transferring media data using 5G network components and protocols.

FIG. 1 is a block diagram illustrating an example system 100 for transferring media data using 5G network components and protocols. System 100 includes Internet 102, edge clouds 104A-104N (edge clouds 104), edge application servers 106A-106N (EASs 106), eNodeBs 108A-108N (eNodeBs 108), and user equipment devices 110A-110M (UE devices 110). Edge clouds 104 may also be referred to as edge data networks (EDNs).

Different EASs, such as the various EASs 160 shown in FIG. 1, may be executed on the same physical host device or on separate physical host devices. Moreover, the various EASs 160 may be in separate edge clouds, such as edge clouds 104A, 104N as shown in FIG. 1. In some cases, it may be beneficial to bundle services provided by EASs, whether in the same physical host device, different physical host devices, and/or even deployed in separate edge clouds. That is, two or more services provided by different EASs 160 may need to be coordinated for execution together to provide a unified, bundled service to one of UE devices 110.

In some examples, various component EASs may have different key performance indicator (KPI) requirements, e.g., latency. Thus, different EASs may be deployed in different EDNs for optimal resource use. For example, a media streaming application may include three EAS components: 1) a content server EAS, 2) a subtext database EAS, and 3) an active directory (AD) server EAS. The content server may require the least latency, while the AD server may be slightly more delay tolerant. Thus, the AD server may be deployed in a more distant EDN. The subtext server can be deployed in a relatively larger and less expensive data center. Therefore, EASs as part of one bundle may be hosted separately, and possibly in different EDNs.

Each of EASs 160 may be separately discoverable, controlled, and located. However, in some cases, a bundled service may require coordination between the various EASs that perform services of the bundled service. This disclosure describes techniques for bundling services provided by EASs together to overcome the conventional lack of such mechanisms in the edge enabler layer and edge management layer to achieve such bundling. This disclosure also describes techniques for provisioning an M1 interface to allow for mechanisms to provision EASs 160 to execute respective services in a bundle.

More particularly, this disclosure describes techniques for bundling of services provided by EASs. An EAS bundle may include a set of EASs that have dependencies among each other. The bundled EASs may need to connect to each other and exchange application data related to one application client (AC). The bundled EASs may also need to be launched together, co-located, or relocated together, in various examples.

An application service provider may have information representative of these dependencies between the EASs to be bundled together. As part of provisioning of a bundled service, there may be an indication of the bundled EASs. The bundling information may be stored as part of an EAS profile. Each EAS of a bundle may have its own respective EAS endpoint. Alternatively, there may be an EAS controller as part of the bundle that is responsible for handling application data traffic. In this case, the EASs need not have individual EAS endpoints. Instead, the bundled service may use the EAS controller endpoint for communication with UE devices 110.

To bundle EASs to form an EAS bundle and a bundled service, there may be an information element as an EAS profile extension, representing bundling information. There may be an information element as an AC profile extension, representing bundling information. In particular, the EAS bundle may include data representing a unique bundle identifier. EASs with the same bundle identifier may have dependencies between each other. The bundle might have certain requirements, such as whether joint or combined application context relocation is required, whether a local private network is required, whether a common host is required, and/or whether joint or combined discoverability is enabled. Additionally, the EAS bundle information may indicate whether joint KPIs are provided. That is, the KPIs may be indicated jointly for the bundle or a subset of EASs of the bundle, instead of separately for each EAS of the bundle. Such joint KPI information may be especially beneficial where there is a requirement for a common host. The bundle identifier may be an alpha-numeric string, and in some examples, the bundle identifier may be created using identifiers of the EASs bundled together. In some examples, the bundle identifier may be referred to as bundle information.

An application service provider (ASP) may have information about dependencies between EASs of a bundled service. For media services, the ASP may use the M1 interface of 5G to provision its service. The ASP may describe the EAS bundle and its requirements. Table 1 below represents an example of provisioning operations related to a bundled service:

TABLE 1

| Operation | Sub-resource path | Allowed HTTP method(s) | Description |
|---|---|---|---|
| Create Edge Configuration | edge-configurations | POST | Adds a new edge configuration to the collection of edge configurations for a particular Provisioning session. |
| Retrieve Edge Configuration | edge-configurations | GET | Used to retrieve a previously created edge configuration. |
| Update Edge Configuration | /{edgeConfig Id} | PUT | Used by the 5GMS Application Provider to update an existing edge configuration. |
| Delete Edge | | DELETE | Removes the specified Edge Configuration Configuration from this Provisioning Session |

Provisioning may further include information that can be used to create EAS profiles. The ASP may indicate requirements on each of the EASs of a bundle. If an EAS configuration is activated, the 5G media streaming application function (5GMS AF) may be configured to set up and configure the edge enabler layer and interacting with an underlying edge hosting environment. Table 2 represents example elements further related to provisioning:

TABLE 2

| Property name | Data Type | Cardinality | Description |
|---|---|---|---|
| EdgeConfiguration | Object | 1 . . . n | Describes an Edge Configuration. |
| schedule | Array(TimeRange) | 0 . . . 1 | The relative path which will be used to address the media resources at interface M2d. This path is provided by the 5GMSd AF in the case of Push-based ingest. |
| EASBundles | Array(EASBundle) | 1 . . . 1 | Collection of EAS Bundle Descriptions |
| EASBundle | EASBundle | 1 . . . n | A description of an EAS bundle. |
| BundleId | number | 0 . . . 1 | Identifier of the bundle of EASs. If not present, the EASs in this collection are considered independent. |
| CommonHost | Boolean | | Indicates if the EASs of this bundle have to run on a common host (VM/container/bare metal server) |
| JointDiscovery | Boolean | | Indicates whether the EASs of this bundle should be discovered jointly |
| JointRelocation | Boolean | | Indicates whether the EASs of this bundle should be relocated jointly |
| JointKPI | EASKPI | 0 . . . 1 | Provides a set of KPIs that are to be used for all EASs of this bundle |
| EASConfigurations | Array(EASConfiguration) | 1 . . . 1 | A collection of EAS configurations. |
| EASConfiguration | EASConfiguration | | Configuration for each EAS of the Bundle |

TABLE 2-continued

| Property name | Data Type | Cardinality | Description |
|---|---|---|---|
| EASKPI | EASKPI | 0 . . . 1 | The KPIs for this EAS |
| GeographicalArea | GeoArea | 0 . . . 1 | Restricts the availability of this EAS to the provided geographical area |

UE devices 110 may be mobile communications devices, such as cellular telephones. Therefore, certain services may need to be relocated to different sets of EASs of different edge clouds as one of UE devices 110 moves between geographical regions. According to the techniques of this disclosure, a bundled service may need to be relocated. When a relocation decision is made for an EAS that is part of a bundle, there may first be a determination of whether joint relocation of multiple EASs is needed. If joint relocation is needed for two or more EASs of the bundle, relocation for all EASs of the bundle deployed in the same EDN may be triggered. Relocation may be treated as an atomic transaction: either all EASs of the bundle are relocated satisfactorily (including any retry attempts for individual EASs), or the relocation fails for all. Target EASs may be required to satisfy the EAS bundle conditions. In some examples, EASs of one bundle deployed in one EDN may be relocated to different EDNs depending on KPI requirements of the individual EASs, e.g., for optimal resource utilization.

Figure 2:
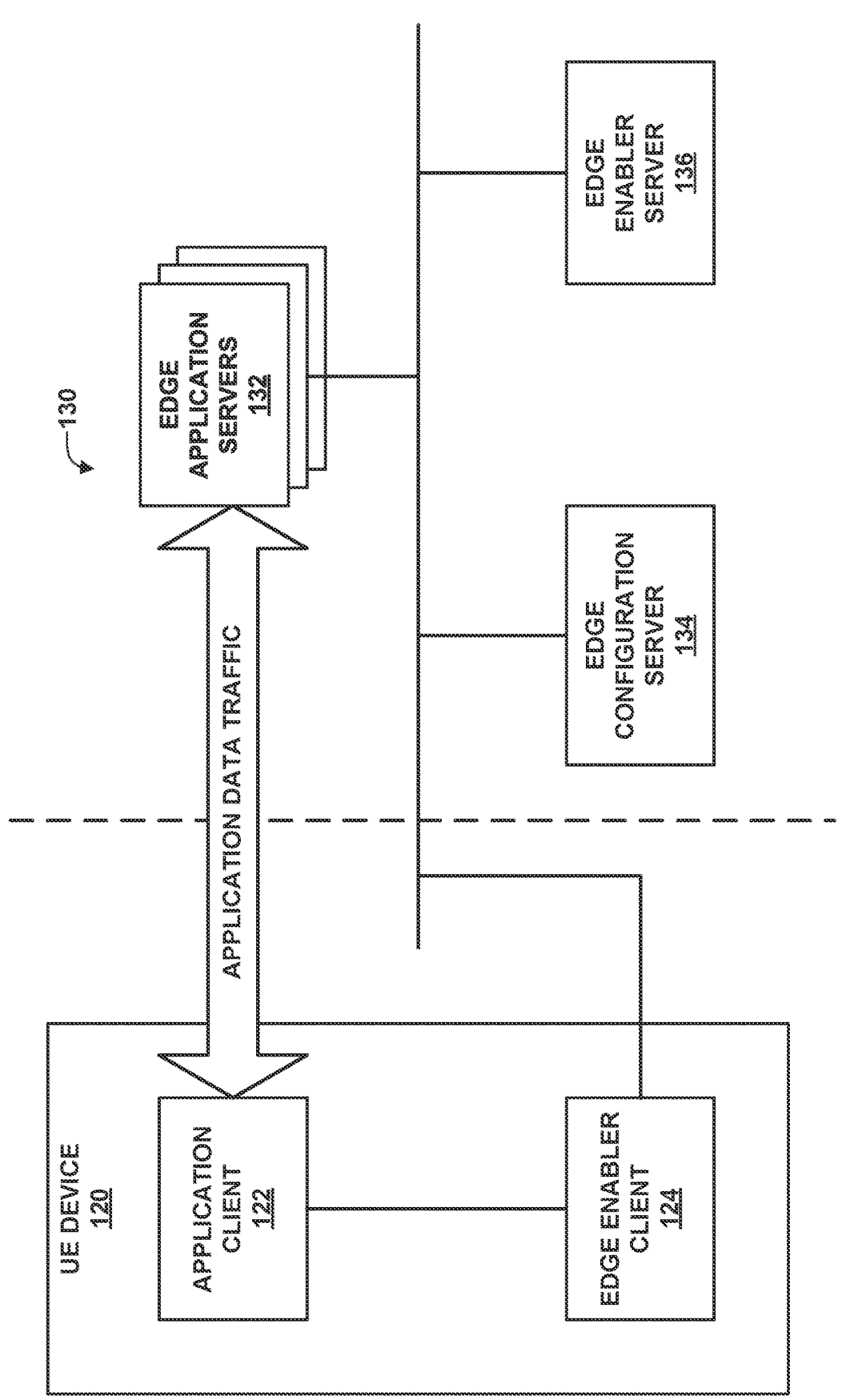
FIG. 2 is a block diagram illustrating an example system including a user equipment (UE) device and edge cloud (e.g., edge data network (EDN)) components.

FIG. 2 is a block diagram illustrating an example system including a user equipment (UE) device 120 and edge cloud 130 (e.g., edge data network (EDN)) components. In particular, UE device 120 includes application client 122 and edge enabler client (EEC) 124. Edge cloud 130 includes edge application servers (EASs) 132, edge configuration server (ECS) 134, and edge enabler server (EES) 136.

In order to access services provided by one of EASs 132, UE device 120 may communicate with ECS 134 and EES 136 of edge cloud 130. For example, EEC 124 of the UE device may discover ECS 134, then perform service provisioning to discover EES 136. ECS 134 may provide information to EEC 124 to connect to EES 136 (such as a network address of EES 136). EEC 134 may then communicate with EES 136 to enable exchange of application data traffic between one of EASs 132 and application client 122 of UE device 120.

As shown in the example of FIG. 2, edge cloud 130 includes multiple EASs 132. In this example, it is assumed that each of EASs 132 is included in a common bundle according to the techniques of this disclosure. Although not shown in the example of FIG. 2, additional EASs may also be provided in edge cloud 130 that do not form part of the bundle. EASs 132 of the same bundle may register with EES 136. As part of an EAS registration request, each of EASs 132 may provide a bundle ID to EES 136. Any or all of EASs 132 may also provide associated key performance indicators (KPIs) and/or bundle requirements (e.g., joint discovery, joint relocation) to EES 136.

EES 136 may associate all of EASs 132 with the same bundle ID as part of the same bundle and apply bundle requirements uniformly to all of associated EASs 132. In some examples, each of EASs 132 may have its own respective EAS endpoint, while in other examples, one of EASs 132 may act as an EAS endpoint for the other ones of EASs 132. That is, an EAS controller may act as the endpoint for, e.g., EDGE-3 and EDGE-7 functionality. In such an example, the EAS controller may perform the EAS registration for all of the EASs controlled by the EAS controller. The EAS controller may provide the bundle ID, KPIs associated with one or more of the EASs of the bundle, and the bundle requirements. The EAS controller may also act as the endpoint for application data traffic to and from AC 122.

In accordance with the techniques of this disclosure, EES 136 may provide identification and associated details, such as bundle requirements of registered bundles, to ECS 134 as part of the registration request. ECS 134 may maintain information associated with the bundles. For example, ECS 134 may maintain information such as:

Bundle 1: EES 1, EAS1, EAS2, EES2: EAS3

Bundle 2: EES 1, EAS4, EAS5, EES3, EAS6

In some examples, the EEC may receive the bundle information from the ASP, e.g., through an AC or from a user, and provide the bundle information to the EES, e.g., via an EEC registration or EAS discovery request. The EES may store this bundle information and use the bundle information to provide services to the EASs according to the bundle requirements.

EEC 124, according to the techniques of this disclosure, may issue a service provisioning request to access a bundled service of EASs 132. EEC 124 may form the service provisioning request to contain a bundle ID to request service provisioning for all EDNs related to the bundle. The bundle ID information may come from the ASP, e.g., by application client 122. In response, ECS 134 may provide EDN details. e.g., information of the EESs associated with the EDNs, of all EDNs containing EASs related to the bundle. This may be done implicitly by ECS 134. For example, upon receiving a service provisioning request related to an EAS that is part of a bundle, ECS 134 may provide EDN details of all EASs associated with the bundle in a response sent to EEC 124. The response may include structured information to clearly indicate the bundling. If the bundle is spread across multiple EDNs, EEC 124 may perform EAS discovery with all EESs of the relevant EDNs.

EEC 124 may perform an extended EAS discovery request for a bundled service according to the techniques of this disclosure, e.g., as follows. The EAS discovery request from EEC 124 to EES 136 may contain an explicit indication that indicates each EAS in a set of EASs of the EAS bundle. In response, EES 136 may provide details for each of the specified EASs associated with the bundle to EEC 124.

Alternatively, EEC 124 may perform an implicit extended EAS discovery request. In particular, EES 136 may receive a request form EEC 124 and determine that the request is for an EAS that belongs to an EAS bundle. In response, EES 136 may provide details for each of the EASs associated with the bundle to EEC 124. The response may include structured information that clearly indicates which EASs belong to each bundle. EES 136 may store the transaction data for short term future requests, e.g., from other UE devices. Thus, future requests for EASs of the same bundle and by the same EEC (i.e., EEC 124) may be resolved to an EAS that is bundled (e.g., one that satisfies the bundle requirements).

Figure 3:
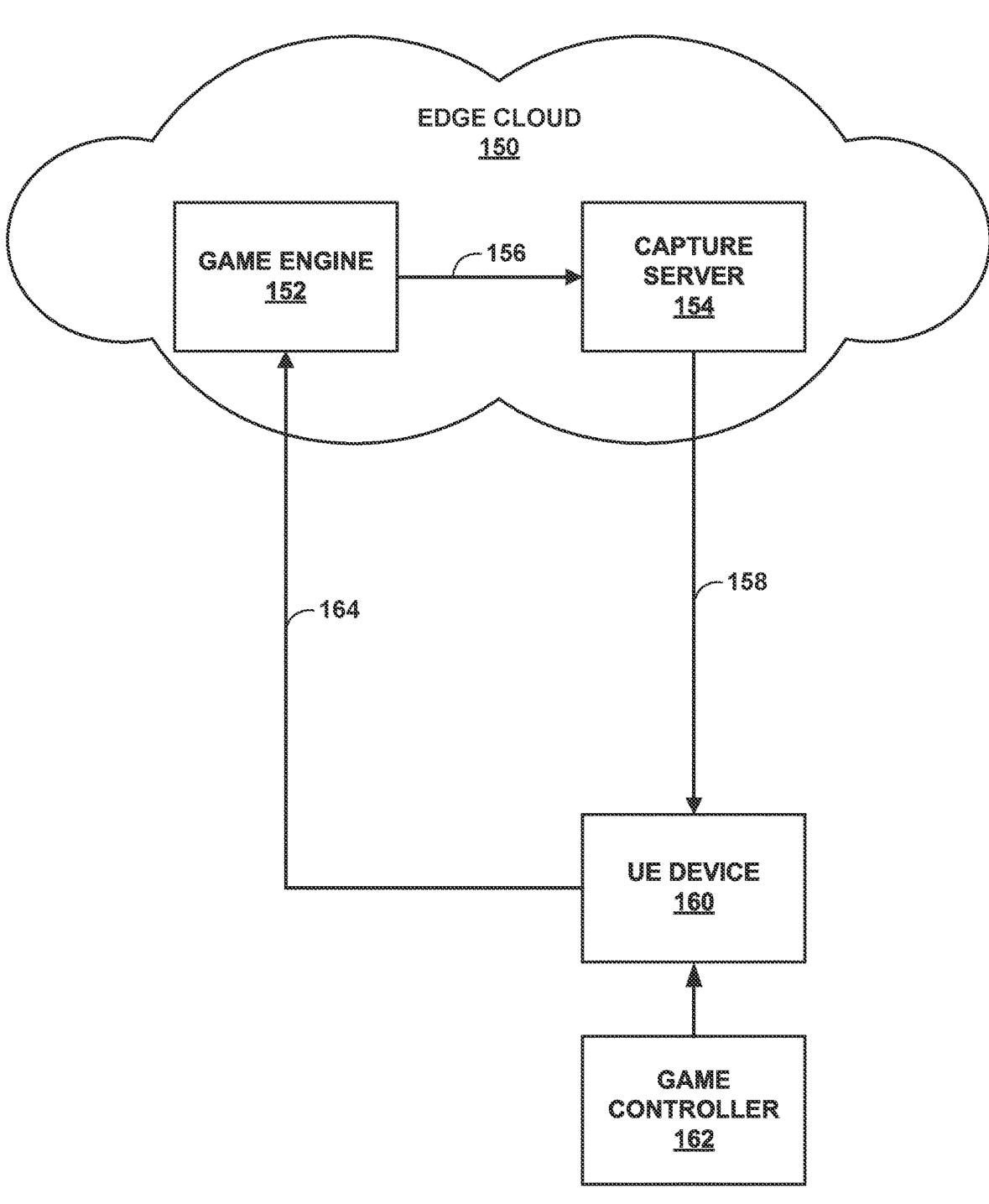
FIG. 3 is a block diagram illustrating an example system for transferring media data using 5G network components and protocols according to the techniques of this disclosure.

FIG. 3 is a block diagram illustrating an example system for transferring media data using 5G network components and protocols according to the techniques of this disclosure. The example of FIG. 3 represents a scenario in which each EAS in a bundle has its own respective EAS endpoint. In this example, FIG. 3 depicts edge cloud 150 including game engine 152 and capture server 154. User equipment (UE) device 160 participates in a remote gaming session in which game engine 152 (hosted on a first EAS) receives user input data 164 from UE device 160 and generates graphics data 156 in response to user input data 164. Capture server 154 (hosted on a second EAS) receives graphics data 156 from game engine 152 and encodes graphics data 156 as encoded video data 158. Capture server 154 further sends encoded video data 158 to UE device 160. Capture server 154 may further add additional information such as a scene description, depth stream, or other such data to the transmission to UE device 160.

UE device 160 decodes encoded video data 158 and displays the decoded video data to a user (not shown in FIG. 3). The user uses game controller 162 to generate user input, e.g., in the form of button presses, physical controller movements, analog joystick movements, or the like. UE device 160 receives input from game controller 162 and sends corresponding user input data 164 to game engine 152.

The example of FIG. 3 depicts a use case in which it may be beneficial to bundle services provided by multiple EASs. In particular, in this example, the EASs include the first EAS including game engine 152 and the second EAS including capture server 154. In this example, game engine 152 and capture server 154 are included in the same edge cloud 150. In other examples, game engine 152 and capture server 154 may be included in separate edge clouds (e.g., separate EDNs). In either case, the techniques of this disclosure may be used to bundle services provided by game engine 152 and capture server 154, or other services provided by other EASs.

The use case shown in the example of FIG. 3 includes a user using UE device 160 and game controller 162 to select and launch a video game from an online game catalog. The user may use game controller 162 to play the video game, which is in fact executed by game engine 152, and for which video data is encoded by capture server 154. In this use case, the user expects fast startup, comparable to if the video game were instead executed locally by UE device 160. Thus, the user may expect the game to start within a few seconds of launch, at most. The user also expects the game to run smoothly with low latency. The user further expects high image quality, lighting effects, realistic graphics, and the like, e.g., comparable to locally executed video games or console games.

UE device 160 may correspond to a cellular phone or other such mobile device. UE device 160 may, therefore, not include a high performance GPU that would otherwise be included in a video game console or gaming computer. Thus, high quality, fast startup, and low latency expectations may require cloud computing and gaming. Game engine 152 may be executed by one or more high performance GPUs of the first EAS for realistic, high quality graphics. Moreover, in this use case, games may be ready to load immediately to reduce startup time, such that no downloads of executable software specific to each game are required.

Deployment in edge cloud 150 may reduce latency to a screen of UE device 160, comparable to other cloud-based solutions. This disclosure recognizes that in this use case, a very short time between capturing by capture server 154 and rendering by capture server 154 is important.

Figure 4:
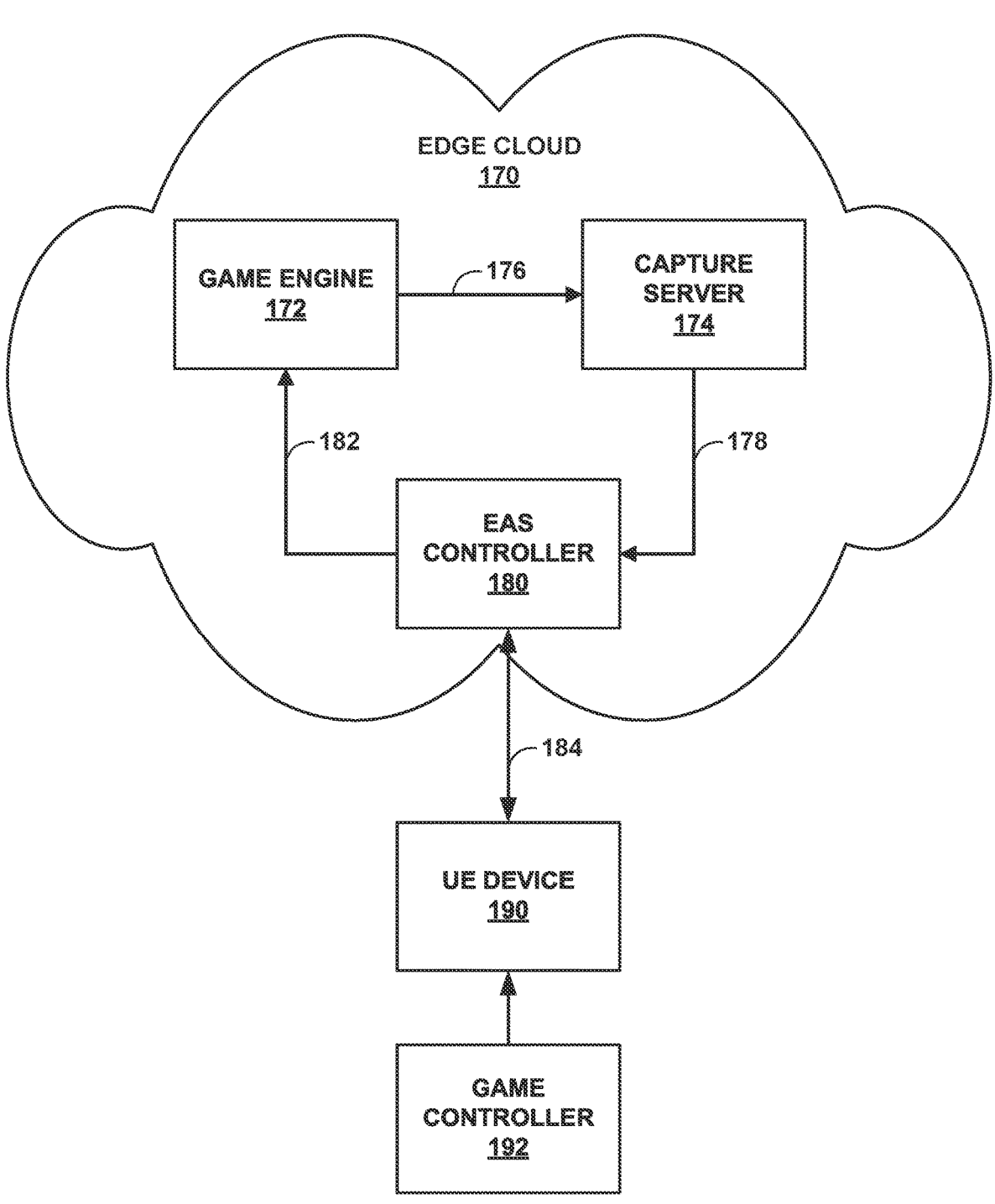
FIG. 4 is a block diagram illustrating another example system for transferring media data using 5G network components and protocols according to the techniques of this disclosure.

FIG. 4 is a block diagram illustrating another example system for transferring media data using 5G network components and protocols according to the techniques of this disclosure. The example of FIG. 3 represents a scenario in which there is a single EAS endpoint for each of a variety of other EASs forming part of an EAS bundle. In this example, FIG. 4 depicts edge cloud 170 including game engine 172, capture server 174, and EAS controller 180. User equipment (UE) device 190 participates in a remote gaming session in which game engine 172 (hosted on a first EAS) receives user input data 182 from UE device 190 via EAS controller 180 (hosted on a third EAS). Game engine 172 generates graphics data 176 in response to user input data 182.

Capture server 174 (hosted on a second EAS) receives graphics data 176 from game engine 172 and encodes graphics data 176 as encoded video data 178. Capture server 174 sends encoded video data 178 to EAS controller 180 via communication session 184. UE device 190 decodes encoded video data 178 and displays the decoded video data to a user (not shown in FIG. 4). The user uses game controller 192 to generate user input, e.g., in the form of button presses, physical controller movements, analog joystick movements, or the like. UE device 190 receives input from game controller 192 and sends corresponding user input data to EAS controller 180 via communication session 184. EAS controller 180 then forwards user input data 182 to game engine 172. In this manner, EAS controller 180 represents an example of a common EAS endpoint for the bundled EASs including game engine 172, capture service 174, and EAS controller 180. Thus, the EASs for game engine 172 and capture service 174 need not have their own respective EAS endpoints for communicating with UE device 190.

The example of FIG. 4 depicts the same use case as that of FIG. 3, except that rather than each EAS having its own respective EAS endpoint, EAS controller 180 acts as a single EAS endpoint for all EASs involved in a bundled EAS/ bundled service. Thus, EAS controller 180 may register with a corresponding EES for all EASs involved in the bundle for EAS registration. The EES may provide the contact address of EAS controller 180 to the EEC of UE device 190 for EAS selection. EAS controller 180 may manage interaction with all edge servers (e.g., game controller 172 and capture server 174) that are needed for an AC type (e.g., the remote video game).

The AC of UE device 190, therefore, need only initiate the bundled service with EAS controller 180 for edge processing associated with the bundled service. In some examples, the AC of UE device 190 may separately interact with game engine 172 and/or capture server 174. That is, communications may be proxied by EAS controller 180 or edge server contact addresses provided to the AC of UE device 190 in the application plane.

When performing application context relocation, a corresponding EES (not shown in FIG. 4) may interact with only EAS controller 180. EAS controller 180 may be responsible for gathering all data about the AC of UE device 190 to send to a target EAS controller for application context relocation.

EAS controller 180 may have a role that is limited to EDGE-3, and the AC of UE device 190 may receive edge server contact addresses from the EES, e.g., based on the bundle ID.

Figure 5:
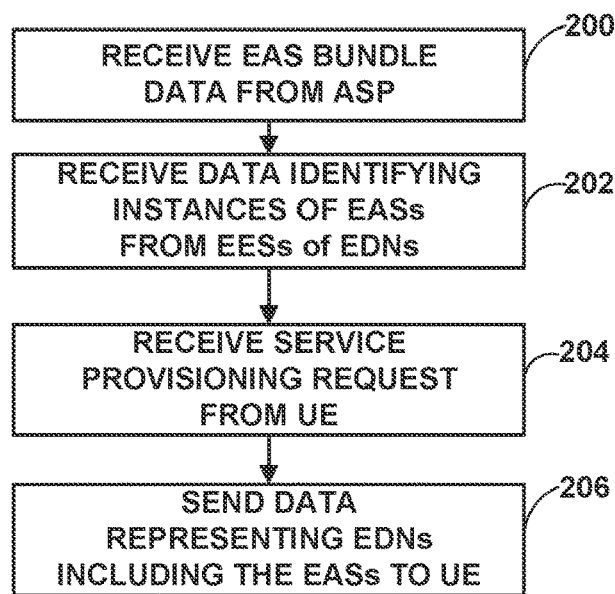
FIG. 5 is a flowchart illustrating an example method of configuring application data traffic exchange between a user equipment (UE) device and a plurality of edge application servers (EASs) according to the techniques of this disclosure.

FIG. 5 is a flowchart illustrating an example method of configuring application data traffic exchange between a user equipment (UE) device and a plurality of edge application servers (EASs) according to the techniques of this disclosure. The method of FIG. 5 may be performed by an edge configuration server (ECS), such as ECS 134 of FIG. 2.

Initially, the ECS may receive data from an application service provider (ASP) representing a bundle of EASs (200). The data may include, for example, a bundle identifier (ID) representing the bundle of EASs and may indicate each of the EASs included in the bundle of EASs. The EASs of the bundle may have dependencies among each other. Likewise, the bundle may have various requirements, such as whether joint relocation is required, whether a local private network is required, whether a common host is required, and/or whether joint discoverability is enabled. Such data may be included in edge configuration data, as discussed above.

The ECS may also receive data identifying instances of each of the EASs in the bundle of EASs from one or more edge enabler servers (EESs) of one or more edge data networks (EDNs) for the EASs (202). EES 136 of FIG. 2 is one example of such an EES from which data identifying instances of the EASs may be received. That is, the EASs may register with the one or more EESs, and the EESs may associate the registered EASs with the same bundle identifier. In some examples, exactly one EES may provide the data identifying the instances of the EASs, while in other examples, multiple EESs may provide the data identifying the instances of the EASs. In some examples, the one or more EESs may further provide data representing the bundle requirements.

Subsequently, the ECS may receive a service provisioning request from a user equipment (UE) device (204). The service provisioning request may include data specifying the bundle ID. The service provisioning request may be a request for services for all EASs related to the bundle. In response, the ECS may send data representing EDNs including the EES(s) information to the UE device from which the service provisioning request was received (206).

In this manner, the method of FIG. 5 represents an example of a method of configuring application data traffic exchange between a user equipment (UE) device and a plurality of edge application servers (EASs), including receiving, by an edge configuration server (ECS), data from an application service provider (ASP) representing a bundle of EASs, the data including a bundle identifier (ID) representing the bundle of EASs and data representing each of the EASs included in the bundle of EASs; receiving, by the ECS, data identifying instances of each of the EASs in the bundle of EASs from one or more edge enabler servers (EESs) associated with one or more edge data networks (EDNs) for the EASs; receiving, by the ECS, a service provisioning request including the bundle ID from a user equipment (UE) device; and sending, by the ECS, in response to the service provisioning request, data representing the one or more EDNs including EESs associated with the EDNs to the UE device.

Figure 6:
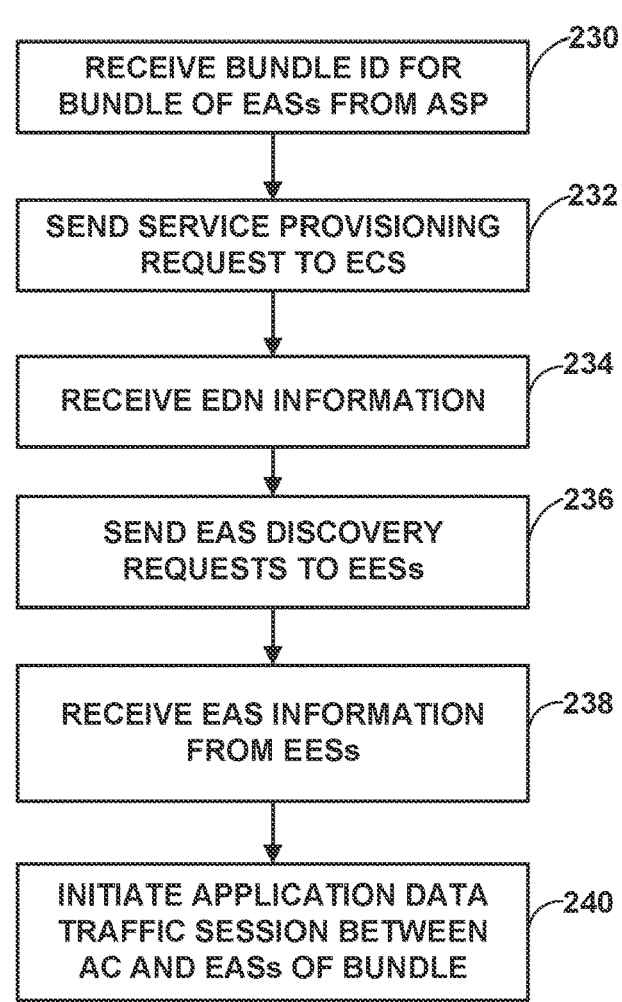
FIG. 6 is a flowchart illustrating an example method of accessing data from a plurality of edge application servers (EASs) according to the techniques of this disclosure.

FIG. 6 is a flowchart illustrating an example method of accessing data from a plurality of edge application servers (EASs) according to the techniques of this disclosure. The method of FIG. 6 may be performed by a user equipment (UE) device, such as UE devices 110 of FIG. 1, UE device 120 of FIG. 2, UE device 160 of FIG. 3, or UE device 190 of FIG. 4. For purposes of example and explanation, the method of FIG. 6 is explained with respect to UE device 120 of FIG. 2.

Initially, UE device 120 may receive data representing a bundle identifier (ID) for a bundle of EASs from an application service provider (230), e.g., through an Application Client or from a user. The EASs may each provide a different type of data for a common application data traffic session. For example, one of the EASs may provide encoded video data, another may provide XR data (e.g., AR, VR, or MR data), and still another may provide audio data. Multiple sets of data of the same type may originate from distinct EASs, e.g., multiple EASs may each provide different, respective sets of XR data for the application data traffic session. Each of the EASs may be included in one or more distinct edge discovery networks (EDNs).

UE device 120 may send a service provisioning request including the bundle ID to an edge configuration server (ECS), such as ECS 134 of FIG. 2 (232). UE device 120 may receive, in response to the service provisioning request, information representing each of the EASs in the bundle of EASs from ECS 134 (234). The information representing the EASs may include information of the EESs on which the bundled EASs are registered and associated EDN information. Using the information representing the EASs, UE device 120 may send one or more EAS discovery requests to one or more edge enabler servers (EESs) (236), such as EES 136 of FIG. 2. In particular, for each EDN including at least one EAS of the bundle of EASs, UE device 120 may send a respective EAS discovery request to the EES in the EDN.

In response to the EAS discovery requests, UE device 120 may receive information for communicating with the EASs in the bundle of EASs from EES 136 (238). Using this information, UE device 120 may initiate the application data traffic session between an application client (AC) (e.g., AC 122) and the EASs in the bundle (240).

In this manner, the method of FIG. 6 represents an example of a method of accessing data from a plurality of edge application servers (EASs), including: receiving, by an edge enabler client (EEC) of a user equipment (UE) device, data representing a bundle identifier (ID) for a bundle of EASs from an application service provider (ASP); sending, by the EEC, a service provisioning request including the bundle ID to an edge configuration server (ECS); in response to the service provisioning request, receiving, by the EEC, information representing each of the EASs in the bundle of EASs from the ECS; in response to the information representing each of the EASs, sending, by the EEC, one or more EAS discovery requests to one or more edge enabler servers (EESs); in response to the one or more EAS discovery requests, receiving, by the EEC, information for communicating with one or more of the EASs in the bundle of EASs from the one or more EESs; and initiating, by the EEC, an application data traffic session between an application client (AC) of the UE device and the one or more of the EASs in the bundle of EASs.

Accordingly, this disclosure describes techniques for bundling EASs. Various examples of these techniques include provisioning, EAS registration, EES registration, EEC service provisioning, EAS discovery, description, and relocation. These techniques may allow a set of EASs to run together to serve an application client (AC) of a UE device.

In some aspects, the role and responsibilities executed by the Edge Enabler Client as described here may be performed by an Edge Enabler Server, e.g., while executing application context relocation procedures.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially. Accordingly, certain examples of the techniques of this disclosure are summarized in the following clauses:

Clause 1: A method of accessing data from a plurality of edge application servers (EASs), the method comprising: receiving, by an edge enabler client (EEC) of a user equipment (UE) device, data representing a bundle identifier (ID) for a bundle of EASs from an application service provider (ASP); sending, by the EEC, a service provisioning request including the bundle ID to an edge configuration server (ECS); in response to the service provisioning request, receiving, by the EEC, information representing each of the EASs in the bundle of EASs from the ECS; in response to the information representing each of the EASs, sending, by the EEC, one or more discovery requests to one or more edge enabler servers (EESs); in response to the one or more discovery requests, receiving, by the EEC, information for communicating with one or more of the EASs in the bundle of EASs from the one or more EESs; and initiating, by the EEC, an application data traffic session between an application client (AC) of the UE device and the one or more of the EASs in the bundle of EASs.

Clause 2: The method of clause 1, wherein receiving the information representing each of the EASs includes receiving information representing one or more edge discovery networks (EDNs) including each of the EESs associated with the EDN where the EASs in the bundle of EASs are registered.

Clause 3: The method of clause 2, wherein a first EDN of the one or more EDNs includes a first EAS of the bundle of EASs, and wherein a second EDN of the one or more EDNs includes a second EAS of the bundle of EASs, the first EDN being different than the second EDN and the first EAS being different than the second EAS.

Clause 4: The method of clause 3, wherein sending the one or more discovery requests comprises: sending a first discovery request to a first EES of the first EDN; and sending a second discovery request to a second EES of the second EDN.

Clause 5: The method of any of clauses 1-4, wherein receiving information representing each of the EASs includes receiving a single set of information representing all of the EASs in the bundle of EASs.

Clause 6: The method of any of clauses 1-5, wherein receiving the information for communicating with the one or more EASs in the bundle of EASs comprises receiving data representing EAS endpoints for each of the EASs in the bundle of EASs.

Clause 7: The method of any of clauses 1-5, wherein receiving the information for communicating with the one or more EASs in the bundle of EASs comprises receiving data representing a single EAS endpoint of an EAS controller in the bundle of EASs.

Clause 8: The method of any of clauses 1-7, wherein the bundle of EASs includes a first EAS configured to execute a game engine and a second EAS configured to execute a capture server, and wherein the application data traffic session includes communicating game input and encoded video data for a remote gaming session.

Clause 9: The method of any of clauses 1-7, wherein the bundle of EASs includes a first EAS configured to execute a content server, a second EAS configured to execute a subtext database, and a third EAS configured to execute an active directory server, and wherein the application data traffic session includes communicating streaming media data.

Clause 10: The method of clause 1, wherein receiving information representing each of the EASs includes receiving a single set of information representing all of the EASs in the bundle of EASs.

Clause 11: The method of clause 1, wherein receiving the information for communicating with the one or more EASs in the bundle of EASs comprises receiving data representing EAS endpoints for each of the EASs in the bundle of EASs.

Clause 12: The method of clause 1, wherein receiving the information for communicating with the one or more EASs in the bundle of EASs comprises receiving data representing a single EAS endpoint of an EAS controller in the bundle of EASs.

Clause 13: The method of clause 1, wherein the bundle of EASs includes a first EAS configured to execute a game engine and a second EAS configured to execute a capture server, and wherein the application data traffic session includes communicating game input and encoded video data for a remote gaming session.

Clause 14: The method of clause 1, wherein the bundle of EASs includes a first EAS configured to execute a content server, a second EAS configured to execute a subtext database, and a third EAS configured to execute an active directory server, and wherein the application data traffic session includes communicating streaming media data.

Clause 15: A user equipment (UE) device for accessing data from a plurality of edge application servers (EASs), the UE device comprising one or more means for performing the method of any of clauses 1-14.

Clause 16: The UE device of clause 15, the one or more means comprising a memory and one or more processors implemented in circuitry.

Clause 17: The UE device of any of clauses 15 and 16, further comprising a display.

Clause 18: The UE device of any of clauses 15-17, wherein the UE device comprises one or more of an camera, a computer, a mobile device, a broadcast receiver device, or a set-top box.

Clause 19: A computer-readable storage medium having stored thereon instructions that, when executed, cause a processor to perform the method of any of clauses 1-14.

Clause 20: A user equipment (UE) device for accessing data from a plurality of edge application servers (EASs), the device comprising: means for receiving data representing a bundle identifier (ID) for a bundle of EASs from an application service provider (ASP); means for sending a service provisioning request including the bundle ID to an edge configuration server (ECS): means for receiving, in response to the service provisioning request, information representing each of the EASs in the bundle of EASs from the ECS; means for sending, in response to the information representing each of the EASs, one or more discovery requests to one or more edge enabler servers (EESs); means for receiving, in response to the one or more discovery requests, information for communicating with one or more of the EASs in the bundle of EASs from the one or more EESs; and means for initiating an application data traffic session between the UE device and the one or more of the EASs in the bundle of EASs.

Clause 21: A method of configuring application data traffic exchange between a user equipment (UE) device and a plurality of edge application servers (EASs), the method comprising: receiving, by an edge configuration server (ECS), data from an application service provider (ASP) representing a bundle of EASs, the data including a bundle identifier (ID) representing the bundle of EASs and data representing each of the EASs included in the bundle of EASs; receiving, by the ECS, data identifying instances of each of the EASs in the bundle of EASs from one or more edge enabler servers (EESs) of one or more edge data networks (EDNs) for the EASs; receiving, by the ECS, a service provisioning request including the bundle ID from a user equipment (UE) device; and sending, by the ECS, in response to the service provisioning request, data representing the one or more EDNs including the EASs to the UE device.

Clause 22: The method of clause 21, wherein receiving the data identifying the instances of each of the EASs in the bundle of EASs comprises receiving the data identifying the instances of each of the EASs in the bundle of EASs from exactly one EES of one EDN.

Clause 23: The method of clause 21, wherein receiving the data identifying the instances of each of the EASs in the bundle of EASs comprises receiving the data identifying the instances of each of the EASs in the bundle of EASs from a plurality of EESs of a respective plurality of EDNs.

Clause 24: The method of any of clauses 21-23, wherein receiving the data identifying the instances of each of the EASs in the bundle of EASs from the one or more EESs further comprises receiving bundle requirements from the one or more EESs.

Clause 25: The method of clause 21, wherein receiving the data identifying the instances of each of the EASs in the bundle of EASs from the one or more EESs further comprises receiving bundle requirements from the one or more EESs.

Clause 26: A device for executing an edge configuration server (ECS) to configure application data traffic exchange between a user equipment (UE) device and a plurality of edge application servers (EASs), the device comprising one or means for performing the method of any of clauses 21-25.

Clause 27: The device of clause 26, the one or more means comprising a memory and one or more processors implemented in circuitry.

Clause 28: A computer-readable storage medium having stored thereon instructions that, when executed, cause a processor to perform the method of any of clauses 21-25.

Clause 29: A device for configuring application data traffic exchange between a user equipment (UE) device and a plurality of edge application servers (EASs), the device comprising: means for receiving data from an application service provider (ASP) representing a bundle of EASs, the data including a bundle identifier (ID) representing the bundle of EASs and data representing each of the EASs included in the bundle of EASs; means for receiving data identifying instances of each of the EASs in the bundle of EASs from one or more edge enabler servers (EESs) of one or more edge data networks (EDNs) for the EASs; means for receiving a service provisioning request including the bundle ID from a user equipment (UE) device; and means for sending, in response to the service provisioning request, data representing the one or more EDNs including the EASs to the UE device.

Clause 30: A method of enabling a bundled service between a user equipment (UE) device and a plurality of edge application servers (EASs), the method comprising: receiving, by an edge enabler server (EES), one or more registration requests for a plurality of EASs, each of the registration requests including data for a common bundle identifier (ID); associating, by the EESs, each of the plurality of EASs in a bundle of EASs associated with the bundle ID; receiving, by the EES, a discovery request from an edge enabler client (EEC) of a user equipment (UE) device including the bundle ID; and in response to the discovery request, providing, to the UE device, data representative of the EASs in the bundle of EASs to the UE device.

Clause 31: The method of clause 30, wherein providing, to the UE device, the data representative of the plurality of EASs includes sending, to the UE device, data representing EAS endpoints for each of the plurality of EASs in the bundle of EASs.

Clause 32: The method of clause 30, wherein providing, to the UE device, the data representative of the plurality of EASs includes sending, to the UE device, data representing a single EAS endpoint for an EAS controller of the EASs in the bundle of EASs.

Clause 33: The method of clause 32, wherein receiving the one or more registration requests comprises receiving a single registration request from the single EAS endpoint, the single registration request representing each of the EASs in the bundle of EASs.

Clause 34: The method of any of clauses 30-33, further comprising sending a registration request for the bundle of EASs to an edge configuration server (ECS).

Clause 35: The method of clause 34, further comprising forming the registration request to include bundle requirements for the bundle of EASs.

Clause 36: The method of clause 30, further comprising sending a registration request for the bundle of EASs to an edge configuration server (ECS).

Clause 37: The method of clause 36, further comprising forming the registration request to include bundle requirements for the bundle of EASs.

Clause 38: A device for executing an edge enabler server (EES) to enable a bundled service between a user equipment (UE) device and a plurality of edge application servers (EASs), the device comprising one or means for performing the method of any of clauses 30-37.

Clause 39: The device of clause 38, the one or more means comprising a memory and one or more processors implemented in circuitry.

Clause 40: A computer-readable storage medium having stored thereon instructions that, when executed, cause a processor to perform the method of any of clauses 30-37.

Clause 41: A device for enabling a bundled service between a user equipment (UE) device and a plurality of edge application servers (EASs), the device comprising: means for receiving one or more registration requests for a plurality of EASs, each of the registration requests including data for a common bundle identifier (ID); means for associating each of the plurality of EASs in a bundle of EASs associated with the bundle ID; means for receiving a discovery request from an edge enabler client (EEC) of a user equipment (UE) device including the bundle ID; and means for providing, in response to the discovery request, data representative of the EASs in the bundle of EASs to the UE device.

Clause 42: A method of controlling a bundle of edge application servers (EASs), the method comprising: determining, by an EAS controller, a plurality of EASs of a bundle of EASs and a bundle identifier (ID) associated with the bundle of EASs; registering, by the EAS controller, the bundle of EASs with an edge enabler server (EES) on behalf of each of the EASs of the bundle of EASs; and maintaining, by the EAS controller, an application data traffic session with a user equipment (UE) device on behalf of each of the EASs of the bundle of EASs, including: in response to receiving data from the UE device via the application data traffic session, sending the data to a corresponding EAS of the bundle of EASs; and in response to receiving data from one of the EASs of the bundle of EASs, sending the data to the UE device.

Clause 43: A device for controlling a bundle of edge application servers (EASs), the device comprising one or means for performing the method of clause 42.

Clause 44: The device of clause 43, the one or more means comprising a memory and one or more processors implemented in circuitry.

Clause 45: A computer-readable storage medium having stored thereon instructions that, when executed, cause a processor to perform the method of clause 42.

Clause 46: A device for controlling a bundle of edge application servers (EASs), the device comprising: means for determining a plurality of EASs of a bundle of EASs and a bundle identifier (ID) associated with the bundle of EASs; means for registering the bundle of EASs with an edge enabler server (EES) on behalf of each of the EASs of the bundle of EASs; and means for maintaining an application data traffic session with a user equipment (UE) device on behalf of each of the EASs of the bundle of EASs, including: means for sending data received from the UE device via the application data traffic session to a corresponding EAS of the bundle of EASs; and means for sending received data from one of the EASs of the bundle of EASs data to the UE device.

Clause 47: A system comprising: an edge configuration server (ECS): an edge enabler server (EES); and a plurality of edge application servers (EASs) forming a bundle of EASs associated with a bundle identifier (ID), wherein one or more of the EASs in the bundle of EASs are configured to register the bundle of EASs and the bundle ID with the ECS, wherein the ECS is configured to receive a service provisioning request including the bundle ID from a user equipment (UE) device and, in response to the service provisioning request, send data to the UE device representing an edge data network (EDN) including the bundle of EASs to the UE device, and wherein the EES is configured to receive a discovery request from the UE device including the bundle ID and, in response to the discovery request, provide, to the UE device, data representative of the EASs in the bundle of EASs.

Clause 48: The system of clause 47, wherein the plurality of EASs includes an EAS controller configured as an EAS endpoint for the bundle of EASs and to maintain an application data traffic session with the UE device on behalf of the bundle of EASs.

Clause 49: The system of clause 48, wherein the EAS controller is configured to perform the method of clause 42.

Clause 50: The system of clause 47, wherein the EES comprises a first EES of a plurality of EESs, each of the plurality of EESs corresponding to a respective different EDN including one or more of the EASs.

Clause 51: The system of any of clauses 47-49, wherein the EES comprises a first EES of a plurality of EESs, each of the plurality of EESs corresponding to a respective different EDN including one or more of the EASs.

Clause 52: The system of any of clauses 47-51, wherein the ECS is configured to perform the method of any of clauses 21-25.

Clause 53: The system of any of clauses 47-52, wherein the EES is configured to perform the method of any of clauses 30-37.

Clause 54: A method of accessing data from a plurality of edge application servers (EASs), the method comprising: receiving, by an edge enabler client (EEC) of a user equipment (UE) device, data representing a bundle identifier (ID) for a bundle of EASs from an application service provider (ASP); sending, by the EEC, a service provisioning request including the bundle ID to an edge configuration server (ECS); in response to the service provisioning request, receiving, by the EEC, information representing each of the EASs in the bundle of EASs from the ECS; in response to the information representing each of the EASs, sending, by the EEC, one or more discovery requests to one or more edge enabler servers (EESs); in response to the one or more discovery requests, receiving, by the EEC, information for communicating with one or more of the EASs in the bundle of EASs from the one or more EESs; and initiating, by the EEC, an application data traffic session between an application client (AC) of the UE device and the one or more of the EASs in the bundle of EASs.

Clause 55: The method of clause 54, wherein receiving the information representing each of the EASs includes receiving information representing one or more edge discovery networks (EDNs) including each of the EESs associated with the EDN where the EASs in the bundle of EASs are registered.

Clause 56: The method of clause 55, wherein a first EDN of the one or more EDNs includes a first EAS of the bundle of EASs. and wherein a second EDN of the one or more EDNs includes a second EAS of the bundle of EASs, the first EDN being different than the second EDN and the first EAS being different than the second EAS.

Clause 57: The method of clause 56, wherein sending the one or more discovery requests comprises: sending a first discovery request to a first EES of the first EDN; and sending a second discovery request to a second EES of the second EDN.

Clause 58: The method of clause 54, wherein receiving information representing each of the EASs includes receiving a single set of information representing all of the EASs in the bundle of EASs.

Clause 59: The method of clause 54, wherein receiving the information for communicating with the one or more EASs in the bundle of EASs comprises receiving data representing EAS endpoints for each of the EASs in the bundle of EASs.

Clause 60: The method of clause 54, wherein receiving the information for communicating with the one or more EASs in the bundle of EASs comprises receiving data representing a single EAS endpoint of an EAS controller in the bundle of EASs.

Clause 61: The method of clause 54, wherein the bundle of EASs includes a first EAS configured to execute a game engine and a second EAS configured to execute a capture server, and wherein the application data traffic session includes communicating game input and encoded video data for a remote gaming session.

Clause 62: The method of clause 54, wherein the bundle of EASs includes a first EAS configured to execute a content server, a second EAS configured to execute a subtext database, and a third EAS configured to execute an active directory server, and wherein the application data traffic session includes communicating streaming media data.

Clause 63: A user equipment (UE) device for accessing data from a plurality of edge application servers (EASs), the UE device comprising: a memory configured to store application data exchanged via an application data traffic session between an application client (AC) of the UE device; and an edge enabler client (EEC) comprising one or more processors implemented in circuitry, the EEC being configured to: receive data representing a bundle identifier (ID) for a bundle of EASs from an application service provider (ASP); send a service provisioning request including the bundle ID to an edge configuration server (ECS); in response to the service provisioning request, receive information representing each of the EASs in the bundle of EASs from the ECS; in response to the information representing each of the EASs, send one or more discovery requests to one or more edge enabler servers (EESs); in response to the one or more discovery requests, receive information for communicating with one or more of the EASs in the bundle of EASs from the one or more EESs; and initiate the application data traffic session between the AC of the UE device and the one or more of the EASs in the bundle of EASs.

Clause 64: The UE device of clause 63, wherein to receive the information representing each of the EASs, the EEC is configured to receive information representing one or more edge discovery networks (EDNs) including each of the EESs associated with the EDN where the EASs in the bundle of EASs are registered.

Clause 65: The UE device of clause 64, wherein a first EDN of the one or more EDNs includes a first EAS of the bundle of EASs, and wherein a second EDN of the one or more EDNs includes a second EAS of the bundle of EASs, the first EDN being different than the second EDN and the first EAS being different than the second EAS.

Clause 66: The UE device of clause 65, wherein to send the one or more discovery requests, the EEC is configured to: send a first discovery request to a first EES of the first EDN; and send a second discovery request to a second EES of the second EDN.

Clause 67: The UE device of clause 63, wherein to receive the information representing each of the EASs, the EEC is configured to receive a single set of information representing all of the EASs in the bundle of EASs.

Clause 68: The UE device of clause 63, wherein to receive the information for communicating with the one or more EASs in the bundle of EASs, the EEC is configured to receive data representing EAS endpoints for each of the EASs in the bundle of EASs.

Clause 69: The UE device of clause 63, wherein to receive the information for communicating with the one or more EASs in the bundle of EASs, the EEC is configured to receive data representing a single EAS endpoint of an EAS controller in the bundle of EASs.

Clause 70: The UE device of clause 63, wherein the bundle of EASs includes a first EAS configured to execute a game engine and a second EAS configured to execute a capture server, and wherein the application data traffic session includes communicating game input and encoded video data for a remote gaming session.

Clause 71: The UE device of clause 63, wherein the bundle of EASs includes a first EAS configured to execute a content server, a second EAS configured to execute a subtext database, and a third EAS configured to execute an active directory server, and wherein the application data traffic session includes communicating streaming media data.

Clause 72: The UE device of clause 63, further comprising a display.

Clause 73: The UE device of clause 63, wherein the UE device comprises one or more of a camera, a computer, a mobile device, a broadcast receiver device, or a set-top box.

Clause 74: A method of configuring application data traffic exchange between a user equipment (UE) device and a plurality of edge application servers (EASs), the method comprising: receiving, by an edge configuration server (ECS), data from an application service provider (ASP) representing a bundle of EASs, the data including a bundle identifier (ID) representing the bundle of EASs and data representing each of the EASs included in the bundle of EASs; receiving, by the ECS, data identifying instances of each of the EASs in the bundle of EASs from one or more edge enabler servers (EESs) of one or more edge data networks (EDNs) for the EASs; receiving, by the ECS, a service provisioning request including the bundle ID from a user equipment (UE) device, and sending, by the ECS, in response to the service provisioning request, data representing the one or more EDNs including the EASs to the UE device.

Clause 75: The method of clause 74, wherein receiving the data identifying the instances of each of the EASs in the bundle of EASs comprises receiving the data identifying the instances of each of the EASs in the bundle of EASs from exactly one EES of one EDN.

Clause 76: The method of clause 74, wherein receiving the data identifying the instances of each of the EASs in the bundle of EASs comprises receiving the data identifying the instances of each of the EASs in the bundle of EASs from a plurality of EESs of a respective plurality of EDNs.

Clause 77: The method of clause 74, wherein receiving the data identifying the instances of each of the EASs in the bundle of EASs from the one or more EESs further comprises receiving bundle requirements from the one or more EESs.

Clause 78: An edge configuration server (ECS) device for configuring application data traffic exchange between a user equipment (UE) device and a plurality of edge application servers (EASs), the ECS device comprising: a memory; and one or more processors implemented in circuitry and configured to: receive data from an application service provider (ASP) representing a bundle of EASs, the data including a bundle identifier (ID) representing the bundle of EASs and data representing each of the EASs included in the bundle of EASs; receive data identifying instances of each of the EASs in the bundle of EASs from one or more edge enabler servers (EESs) of one or more edge data networks (EDNs) for the EASs; receive a service provisioning request including the bundle ID from a user equipment (UE) device; and send, in response to the service provisioning request, data representing the one or more EDNs including the EASs to the UE device.

Clause 79: The ECS device of clause 78, wherein to receive the data identifying the instances of each of the EASs in the bundle of EASs, the one or more processors are configured to receive the data identifying the instances of each of the EASs in the bundle of EASs from exactly one EES of one EDN.

Clause 80: The ECS device of clause 78, wherein to receive the data identifying the instances of each of the EASs in the bundle of EASs, the one or more processors are configured to receive the data identifying the instances of each of the EASs in the bundle of EASs from a plurality of EESs of a respective plurality of EDNs.

Clause 81: The ECS device of clause 78, wherein to receive the data identifying the instances of each of the EASs in the bundle of EASs from the one or more EESs, the one or more processors are further configured to receive bundle requirements from the one or more EESs.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of accessing data from a plurality of edge application servers (EASs), the method comprising:

receiving, by an edge enabler client (EEC) of a user equipment (UE) device, data representing a bundle identifier (ID) for a bundle of EASs from an application service provider (ASP);

sending, by the EEC, a service provisioning request including the bundle ID to an edge configuration server (ECS);

in response to the service provisioning request, receiving, by the EEC, information representing each of the EASs in the bundle of EASs from the ECS;

in response to the information representing each of the EASs, sending, by the EEC, one or more EAS discovery requests to one or more edge enabler servers (EESs);

in response to the one or more EAS discovery requests, receiving, by the EEC, information for communicating with one or more of the EASs in the bundle of EASs from the one or more EESs; and initiating, by the EEC, an application data traffic session between an application client (AC) of the UE device and the one or more of the EASs in the bundle of EASs.

2. The method of claim 1, wherein receiving the information representing each of the EASs includes receiving information representing one or more edge discovery networks (EDNs) including each of the EESs associated with the EDN where the EASs in the bundle of EASs are registered.

3. The method of claim 2, wherein a first EDN of the one or more EDNs includes a first EAS of the bundle of EASs, and wherein a second EDN of the one or more EDNs includes a second EAS of the bundle of EASs, the first EDN being different than the second EDN and the first EAS being different than the second EAS.

4. The method of claim 3, wherein sending the one or more EAS discovery requests comprises:

sending a first EAS discovery request to a first EES of the first EDN; and sending a second EAS discovery request to a second EES of the second EDN.

5. The method of claim 1, wherein receiving information representing each of the EASs includes receiving a single set of information representing all of the EASs in the bundle of EASs.

6. The method of claim 1, wherein receiving the information for communicating with the one or more EASs in the bundle of EASs comprises receiving data representing EAS endpoints for each of the EASs in the bundle of EASs.

7. The method of claim 1, wherein receiving the information for communicating with the one or more EASs in the bundle of EASs comprises receiving data representing a single EAS endpoint of an EAS controller in the bundle of EASs.

8. The method of claim 1, wherein the bundle of EASs includes a first EAS configured to execute a game engine and a second EAS configured to execute a capture server, and wherein the application data traffic session includes communicating game input and encoded video data for a remote gaming session.

9. The method of claim 1, wherein the bundle of EASs includes a first EAS configured to execute a content server, a second EAS configured to execute a subtext database, and a third EAS configured to execute an active directory server, and wherein the application data traffic session includes communicating streaming media data.

10. A user equipment (UE) device for accessing data from a plurality of edge application servers (EASs), the UE device comprising:

a memory configured to store application data exchanged via an application data traffic session between an application client (AC) of the UE device; and an edge enabler client (EEC) comprising one or more processors implemented in circuitry, the EEC being configured to:

receive data representing a bundle identifier (ID) for a bundle of EASs from an application service provider (ASP);

send a service provisioning request including the bundle ID to an edge configuration server (ECS);

in response to the service provisioning request, receive information representing each of the EASs in the bundle of EASs from the ECS;

in response to the information representing each of the EASs, send one or more EAS discovery requests to one or more edge enabler servers (EESs);

in response to the one or more EAS discovery requests, receive information for communicating with one or more of the EASs in the bundle of EASs from the one or more EESs; and initiate the application data traffic session between the AC of the UE device and the one or more of the EASs in the bundle of EASs.

11. The UE device of claim 10, wherein to receive the information representing each of the EASs, the EEC is configured to receive information representing one or more edge discovery networks (EDNs) including each of the EESs associated with the EDN where the EASs in the bundle of EASs are registered.

12. The UE device of claim 11, wherein a first EDN of the one or more EDNs includes a first EAS of the bundle of EASs, and wherein a second EDN of the one or more EDNs includes a second EAS of the bundle of EASs, the first EDN being different than the second EDN and the first EAS being different than the second EAS.

13. The UE device of claim 12, wherein to send the one or more EAS discovery requests, the EEC is configured to:

send a first EAS discovery request to a first EES of the first EDN; and send a second EAS discovery request to a second EES of the second EDN.

14. The UE device of claim 10, wherein to receive the information representing each of the EASs, the EEC is configured to receive a single set of information representing all of the EASs in the bundle of EASs.

15. The UE device of claim 10, wherein to receive the information for communicating with the one or more EASs in the bundle of EASs, the EEC is configured to receive data representing EAS endpoints for each of the EASs in the bundle of EASs.

16. The UE device of claim 10, wherein to receive the information for communicating with the one or more EASs in the bundle of EASs, the EEC is configured to receive data representing a single EAS endpoint of an EAS controller in the bundle of EASs.

17. The UE device of claim 10, wherein the bundle of EASs includes a first EAS configured to execute a game engine and a second EAS configured to execute a capture server, and wherein the application data traffic session includes communicating game input and encoded video data for a remote gaming session.

18. The UE device of claim 10, wherein the bundle of EASs includes a first EAS configured to execute a content server, a second EAS configured to execute a subtext database, and a third EAS configured to execute an active directory server, and wherein the application data traffic session includes communicating streaming media data.

19. The UE device of claim 10, further comprising a display.

20. The UE device of claim 10, wherein the UE device comprises one or more of a camera, a computer, a mobile device, a broadcast receiver device, or a set-top box.

* * * * *